United States Patent
Dateki et al.

(10) Patent No.: US 8,681,747 B2
(45) Date of Patent: *Mar. 25, 2014

(54) WIRELESS COMMUNICATION SYSTEM

(75) Inventors: Takashi Dateki, Kawasaki (JP); Tetsuya Yano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/160,960

(22) Filed: Jun. 15, 2011

(65) Prior Publication Data

US 2011/0243265 A1 Oct. 6, 2011

Related U.S. Application Data

(62) Division of application No. 11/090,592, filed on Mar. 28, 2005.

(30) Foreign Application Priority Data

Dec. 14, 2004 (JP) .................................. 2004-360878

(51) Int. Cl.
*H04W 4/00* (2009.01)

(52) U.S. Cl.
USPC ........... 370/334; 370/332; 370/336; 370/328; 370/329; 370/344; 455/522; 455/517; 455/550.1

(58) Field of Classification Search
USPC ................ 370/334, 332, 336, 328, 329, 344; 455/550.1, 522, 517
See application file for complete search history.

(56) References Cited

U.S. PATENT DOCUMENTS

| | | | |
|---|---|---|---|
| 5,119,397 A | 6/1992 | Dahlin | |
| 6,172,970 B1 | 1/2001 | Ling et al. | |
| 6,754,475 B1 | 6/2004 | Harrison et al. | |
| 7,392,460 B2 * | 6/2008 | Kim et al. | 714/781 |
| 2003/0060173 A1 | 3/2003 | Lee | |
| 2003/0139196 A1 | 7/2003 | Medvedev et al. | |
| 2003/0174767 A1 | 9/2003 | Fujii | |
| 2003/0181171 A1 * | 9/2003 | Sim et al. | 455/101 |
| 2003/0236069 A1 | 12/2003 | Sakata | |
| 2004/0027994 A1 * | 2/2004 | Baines | 370/252 |

(Continued)

FOREIGN PATENT DOCUMENTS

| | | |
|---|---|---|
| EP | 1300978 A1 | 4/2003 |
| EP | 1388966 A2 | 2/2004 |

(Continued)

OTHER PUBLICATIONS

"Incearsing MIMO throughput with per-antennas rate control", 3GPP TSG-R1(01)0879, Lucent Technologies, Aug. 27-31, 2001.*

(Continued)

*Primary Examiner* — Khai M Nguyen
(74) *Attorney, Agent, or Firm* — Smith, Gambrell & Russell, LLP

(57) ABSTRACT

A wireless communication system is disclosed including a MIMO wireless communication apparatus that can communicate through multiple antennas and a non-MIMO wireless communication apparatus that can communicate through a single antenna or multiple antennas. The MIMO wireless communication apparatus includes a communication unit configured to transmit and receive control information divided into a second control information containing information related to the demodulation and decoding of traffic channel and a first control information containing information related to the MIMO separation of the second control information.

3 Claims, 15 Drawing Sheets

(56) References Cited

U.S. PATENT DOCUMENTS

| | | | |
|---|---|---|---|
| 2004/0062221 A1 | 4/2004 | Gopalakrishnan | |
| 2004/0082356 A1* | 4/2004 | Walton et al. | 455/522 |
| 2004/0171359 A1 | 9/2004 | Tirkkonen et al. | |
| 2004/0174846 A1 | 9/2004 | Kwon | |
| 2004/0219959 A1 | 11/2004 | Khayrallah et al. | |
| 2004/0253955 A1 | 12/2004 | Love et al. | |
| 2004/0268206 A1* | 12/2004 | Kim et al. | 714/758 |
| 2005/0063345 A1 | 3/2005 | Wu | |
| 2005/0107036 A1 | 5/2005 | Song | |
| 2005/0250506 A1 | 11/2005 | Beale | |
| 2005/0265225 A1 | 12/2005 | Mahadevappa | |
| 2006/0083195 A1 | 4/2006 | Forenza | |
| 2006/0115014 A1 | 6/2006 | Jeong et al. | |
| 2006/0141968 A1 | 6/2006 | Masaki | |
| 2008/0109695 A1* | 5/2008 | Jen | 714/748 |
| 2009/0124211 A1 | 5/2009 | Itoh | |
| 2010/0074229 A1* | 3/2010 | Seki | 370/335 |

FOREIGN PATENT DOCUMENTS

| | | |
|---|---|---|
| JP | 2003332963 A | 11/2003 |
| JP | 2003338779 A | 11/2003 |
| JP | 2004135304 A | 4/2004 |
| JP | 2004297172 A | 10/2004 |

OTHER PUBLICATIONS

3GPP TS 25.212 v5.7.0 (Dec. 2003); 3rd Generation Partnership Project; Technical Specification Group Radio Access Network; Multiplexing and channel coding (FDD) (release 5).*

Per Stream Rate Control with Code Reuse TxAA and APP Decoding for HSDPA, Paris France, Apr. 9-12, 2002.

"Increasing MIMO Throughout Per-Antenna Rate Control," 3GPP TSG-RI (01) 0879, Lucent Technologies. Aug. 27-31, 2001.

"3rd Generation Partnership Project; Technical Specification Group Radio Access Network; Physical Layer Procedures (FDD)" 3GPP TS 25.214 v5.7.0, Valbonne, France, 2004.

"3rd Generation Partnership Project; Technical Specification Group Radio Access Network; Spreading and Modulation (FDD)" 3GPP TS 25.213 v5.5.0 (Dec. 2003), Valbonne, France, 2004.

"3rd Generation Partnership Project: Technical Specification Group Radio Access Network; Multiplexing and Channel Coding (FDD)," 3GPP TS 25.212 v5.7.0 (Dec. 2003), Valbone, France, 2004.

"3rd Generation Partnership Project: Technical Specification Group Radio Access Network; Physical Channels and Mapping of Transport Channels Onto Physical Channels (FDD)" 3GPP TS 25.211 v5.5.0 (Sep. 2003), Valbonne, France, 2003.

A. Hottinen, et al., "Multi-Antenna Transceiver Techniques for 3G and Beyond," West Sussex, England: John Wile & Sons Ltd, 2003, pp. 3-9 and 30-31.

Final Office Action dated Aug. 7, 2009 received in U.S. Appl. No. 11/090,592.

Non-Final Office Action dated Sep. 14, 2006 received in U.S. Appl. No. 11/090,592.

Non-Final Office Action dated May 7, 2007 received in U.S. Appl. No. 11/090,592.

Non-Final Office Action dated Jan. 23, 2008 received in U.S. Appl. No. 11/090,592.

Non-Final Office Action dated Nov. 10, 2008 received in U.S. Appl. No. 11/090,592.

Non-Final Office Action dated Feb. 15, 2011 received in U.S. Appl. No. 11/090,592.

Non-Final Office Action dated Aug. 2, 2011 received in U.S. Appl. No. 11/090,592.

Restriction Requirement dated Oct. 15, 2007 received in U.S. Appl. No. 10/090,592.

Advisory Action dated Jan. 19, 2010 received in U.S. Appl. No. 10/090,592.

European Search Report dated Mar. 28, 2006 received in European Patent Application No. 05251676.2-2411.

Non-Final Office Action dated Nov. 30, 2011 received in U.S. Appl. No. 11/090,592.

First Notification of Office Action dated Feb. 13, 2012 received in corresponding Chinese Application No. 200910139289.4.

A Technical Tutorial on the IEEE 802.11 by Pablo Brenner Protocol published Jul. 18, 1996 by BreezeCom Wireless Communications pp. 1-24.

Non-Final Office Action dated Mar. 14, 2012 received in U.S. Appl. No. 11/090,592.

Notification of Reasons of Refusal in Japanese Patent Application No. 2010-167058 dated Apr. 24, 2012.

Notice of Allowance dated Aug. 16, 2012 in U.S. Appl. No. 11/090,592.

Non-Final Office Action dated Nov. 16, 2012 in U.S. Appl. No. 13/566,365.

Non-final Office Action dated May 3, 2013 in U.S. Appl. No. 11/090,592.

Non-final Office Action dated Jun. 3, 2013 in U.S. Appl. No. 13/566,365.

Final Office Action dated Sep. 17, 2013 in U.S. Appl. No. 11/090,592.

Non-final Office Action dated Dec. 17, 2013 in U.S. Appl. No. 13/653,861.

Notice of Allowance dated Dec. 12, 2013 in U.S. Appl. No. 13/566,365.

Notice of Allowance dated Oct. 30, 2013 in U.S. Appl. No. 11/090,592.

* cited by examiner

FIG.7A

| CHANNEL | MIMO MULTIPLEXING | INFORMATION CONTENT | mode 1 | mode 2 | mode 3 |
|---|---|---|---|---|---|
| C1 | NONE | USER-ID | 16 | 16 | 16 |
| | | MIMO-mode (M1) OF C2 | N | N | N |
| C2 | SWITCHED BY C1 | DECODING INFORMATION | 16 | 16 | 16N |
| | | DEMODULATION INFORMATION | 8 | 8 | 8N |
| | | MIMO-mode (M2) OF TC | N | N | N |
| TC | SWITCHED BY C2 | TRAFFIC DATA | Ndata | Ndata | Ndata × N |

FIG.7B

| mode | C2 | TC |
|---|---|---|
| mode 1 | normal | normal |
| mode 2 | normal | MIMO |
| mode 3 | MIMO | MIMO |

FIG.8A

| CHANNEL | MIMO MULTIPLEXING | INFORMATION CONTENT | mode 1 | mode 2 | mode 3 |
|---|---|---|---|---|---|
| C1 | NONE | USER-ID | 16 | 16 | 16 |
| | | MIMO-mode (M1) OF C2 AND TC | N | N | N |
| C2 | SWITCHED BY C1 | DECODING INFORMATION | 16 | 16N | 16N |
| | | DEMODULATION INFORMATION | 8 | 8N | 8N |
| TC | SWITCHED BY C2 | TRAFFIC DATA | Ndata | Ndata × N | Ndata × N |

FIG.8B

| mode | C2 | TC |
|---|---|---|
| mode 1 | normal | normal |
| mode 2 | MIMO | MIMO |
| mode 3 | MIMO | MIMO |

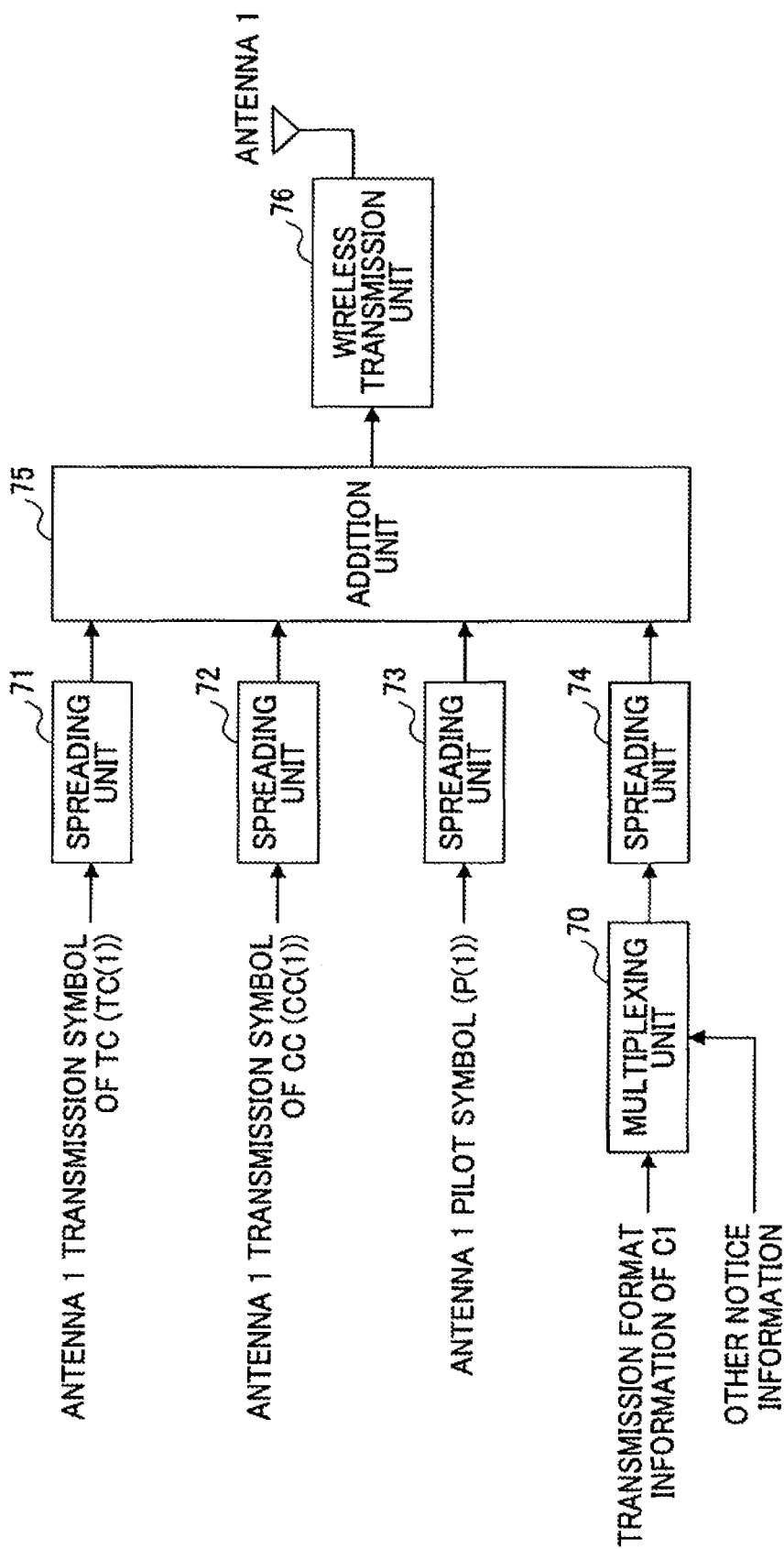

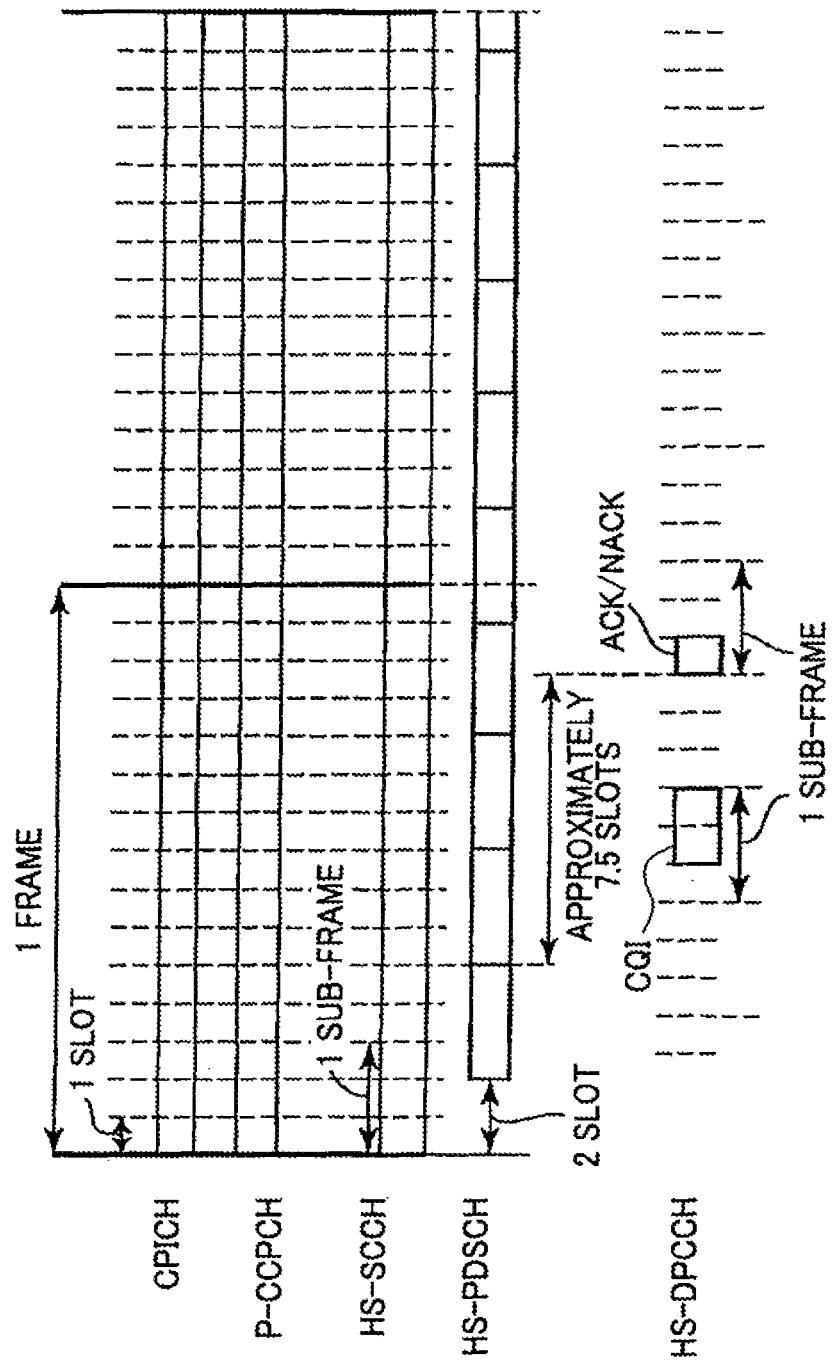

FIG.16

| | | MIMO: NOT USED | MIMO:N MULTIPLEXING 1 PACKET MODE | MIMO:N MULTIPLEXING N INDEPENDENT STREAM MODE |
|---|---|---|---|---|
| (a) Xccs | Channelization-code-set information | 7 | 7 | 7N |
| (b) Xms | Modulation scheme information | 1 | 1 | N |
| (c) Xtbs | Transport-block size information | $6+[\log_2(N)]$ | $6+[\log_2(N)]$ | 6N |
| (d) Xha | Hybrid-ARQ process information | 3 | 3 | 3N |
| (e) Xrv | Redundancy and constellation version | 3 | 3 | 3N |
| (f) Xnd | New data indicator | 1 | 1 | N |
| (g) Xue | UE identity | 16 | 16 | 16 |
| | MIMO mode (TURNING ON/OFF STEAM BY STREAM) | N | N | N |
| | TOTAL | $37+N+[\log_2(N)]$ | $37+N+[\log_2(N)]$ | $22N+16$ |
| | TOTAL (N=2) | 40 | 40 | 60 |
| | TOTAL (N=4) | 43 | 43 | 104 |
| | TOTAL (N=8) | 48 | 48 | 192 |

WIRELESS COMMUNICATION SYSTEM

BACKGROUND OF THE INVENTION

1. Field of the Invention

The present invention generally relates to a wireless communication system and a wireless communication apparatus included therein that communicates data, and more particularly, to a wireless communication system and a wireless communication apparatus included therein having one or more antenna.

2. Description of the Related Art

A conventional wireless communication apparatus generally has an antenna for transmission and an antenna for reception, or a single antenna for transmission and reception. A wireless communication apparatus having multiple antennas using space-diversity reception techniques is known. A wireless communication system is also known as a Multiple Input Multiple Output (MIMO) system in which both a transmitting apparatus and a receiving apparatus are provided with multiple antennas, and the transmitting apparatus and the receiving apparatus communicate using space division multiplexing techniques in accordance with the number of antennas. Multiple data streams are transmitted between the multiple antennas of the transmitting apparatus and those of the receiving apparatus using space division multiplexing techniques through independent multiple channels. Various techniques of MIMO are under development (see reference documents No. 1 through 4, for example).

Technique for a MIMO wireless communication system is proposed in which each data stream is adaptively controlled such that the transmission rate thereof becomes optimal (see reference document No. 5, for example). A wireless communication system using Wideband-Code Division Multiple Access (W-CDMA) is known in which data is transmitted by modulating and multiplexing each channel with spreading code. This W-CDMA technique has been already used for wireless communications between a cellular phone and a base station, for example.

High Speed Downlink Packet Access (HSDPA) is defined that enables the W-CDMA system to transmit data at 14 Mbps or less through a downlink. This system employs adaptive encoding modulation system for packet transmission, in which Quadrature Phase Shift Keying (QPSK) and Quadrature Amplitude Modulation (16 level QAM), for example, are adaptively switched, such that transmission rate can be adapted to the condition of wireless transmission channel.

The HSDPA employs Hybrid Automatic Repeat Request (H-ARQ). For example, if a mobile terminal detects an error in data received from a base station, the mobile terminal requests the base station to re-transmit the data. The base station re-transmits the data in response to receipt of the request. The mobile terminal uses both of the original data and re-transmitted data to perform error correction.

An example of wireless channel used in the HSDPA system includes High Speed-Shared Control Channel (HS-SCCH), High Speed-Physical Downlink Shared Channel (HS-PDSCH), (High Speed-Dedicated Physical Control Channel).

The wireless channels HS-SCCH and HS-PDSCH are common channels (downlink) from a base station to a mobile terminal of a mobile wireless communication system. HS-SCCH is a control channel through which various parameters related to data transmitted through HS-PDSCH are transmitted. An example of the parameters includes modulation type information indicating modulation method by which data is transmitted using HS-PDSCH, the number of spreading codes, the pattern information of rate matching processing performed on transmission data.

HS-DPCCH is a individual control channel (uplink) from the mobile terminal to the base station of the mobile wireless communication system. The HS-DPCCH transmits ACK signal or NACK signal from the mobile terminal to the base station, which indicates whether data is correctly received through the HS-PDSCH. For example, if CRC error is detected in the received data, a NACK signal is transmitted to the base station. In response to receipt of the NACK signal, the base station re-transmits the data. HS-DPCCH is used to periodically transmit the result of measurement on the condition of received signal from the base station (Signal to Interference Ratio (SIR), for example) as a Channel Quality Indicator (CQI). The base station determines whether the condition of downlink wireless channel is satisfactory. If satisfactory, the base station changes the modulation method to a modulation method with which data can be transmitted at higher speed. If not satisfactory, the base station changes the modulation method to a modulation method with which data is transmitted at lower speed.

FIG. 15 is a schematic diagram for explaining the channel structure of the HSDPA. In FIG. 15, CPICH, P-CCPCH, HS-SCCH, HS-PDSCH, and HS-DPCCH are schematically shown. Common Pilot Channel (CPICH) and Primary Common Control Physical Channel (P-CCPCH) are downlink common channels. The CPICH is used for channel estimation, cell search, and timing of other downlink physical channels in the same cell. The CPICH is a channel through which so-called pilot signals are transmitted. The P-CCPCH is a channel through which notice information is transmitted. The HS-SCCH, HS-PDSCH, HS-DPCCH are control channels described above. The above CQI and ACK/NACK are transmitted through the HS-DPCCH.

Fifteen slots form one frame (10 ms). Because the CPICH is used as the reference of timing, the heads of the P-CCPCH and HS-SCCH match the head of the CPICH in timing. However, the head of the HS-PDSCH lags behind the other channels by two slots. This lag allows a mobile terminal to receive information required for the demodulation of the HS-PDSCH. That is, information related to modulation and spreading code is transmitted through the HS-SCCH before the demodulation and decoding of the HS-PDSCH. In HS-SCCH and HS-PDSCH, three slots form one sub-frame.

According to 3GPP TS25.212 v.5.7.0, the following information are transmitted through the HS-SCCH:

(a) Channelization Code Set Information (Xccs): 7 bits, information of spreading code used for the HS-DSCH;

(b) Modulation Scheme Information (Xms): 1 bit, demodulation technique used for the HS-DSCH;

(c) Transport-Block Size Information (Xtbs): 6 bits, the block size of transmission data converted into error correction code;

(d) Hybrid-ARQ Process Information (Xhap): 3 bits, process number for re-transmission;

(e) Redundancy and Constellation Version (Xrv): 3 bits, a parameter for rate matching;

(f) New Data Indicator (Xnd): 1 bit, information indicating new data; and (g) UE Identity (Xue): 16 bits, user identification information.

The information transmitted through the HS-SCCH has 37 bits. This information allows the mobile terminal to learn the parameter of modulation technique, spreading code, error correction used in the HS-DSCH. As a result, the mobile terminal can demodulate and decode HS-DSCH based on these parameters.

The (a) Xccs indicates spreading code used for the transmission of data through HS-PDSCH, such as a combination of the number of multicodes and code offset. The (b) Xms indicates which modulation technique, QPSK or 16 level QAM, is used by "1" and "0". The (c) Xtbs is data for calculating the size of data transmitted by one sub-frame of HS-PDSCH. The (d) Xhap indicates the process number of H-ARQ, which is a serial number of transmitted data block. When data is re-transmitted, the same process number as the previous transmission data is used.

The (e) Xrv indicates the redundancy version parameter and constellation parameter of HS-PDSCH in re-transmission. A determination is made of whether the parameters are updated depending on the case of transmission and re-transmission. The (f) Xnd indicates whether a transmission block of HS-PDSCH is new block or re-transmitted block. If new block, Xnd alternates between "1" and "0". If re-transmitted block, Xnd is the same as that of the original block. The (g) Xue is the identification information of a mobile terminal (user).

The reception of HS-SCCH allows the mobile terminal to know the parameters of modulation technique, spreading code, and error correction used in HS-PDSCH and to demodulate and decode the HS-PDSCH.

The following documents are cited for reference: (1) Japanese Patent Laid-Open Application No. 2004-135304; (2) Japanese Patent Laid-Open Application No. 2003-338779; (3) Japanese Patent Laid-Open Application No. 2003-332963; (4) Ari Hottinen, Olav Tirkkonen, Risto Wichman, "Multi-antenna Transceiver Techniques for 3G and Beyond"; (5) 3GPP TS 25. 211 v5.5.0 ($3^{rd}$ Generation Partnership Project; Technical Specification Group Radio Access Network; Physical channels and mapping of transport channels onto physical channels (FDD)); (6) 3GPP TS 25.213 v5.5.0 ($3^{rd}$ Generation Partnership Project; Technical Specification Group Radio Access Network; Spreading and modulation (FDD)); and (7) 3GPP TS 25.214 v5.7.0 ($3^{rd}$ Generation Partnership Project; Technical Specification Group Radio Access Network; Physical layer procedures (FDD)).

The number of bits required for the above parameters (a) Xccs, (b) Xms, (c) Xtbs, (d) Xha, (e) Xrv, (f) Xnd, and (g) Xue, in the case in which the HSDPA system is adapted to the MIMO system, are shown in FIG. 16 for a mode in which MIMO is not used, a N multiplexing 1 packet mode in which MIMO is used, and a N multiplexing stream independent mode in which MIMO is used. In FIG. 16, N means the number of MIMO multiplexing, and [log 2(N)] means the least integer equal to or more than N.

The above N multiplexing 1 packet mode is a mode in which a packet is divided into data, and each item of the data is transmitted through one of N paths formed by the MIMO multiplexing. The above N multiplexing stream independent mode is a mode in which different packets are transmitted through N paths, respectively, formed by the MIMO multiplexing.

In the MIMO N multiplexing stream independent mode, different transmission technique can be applied to each path. As a result, if the number of MIMO multiplexing N increases, the amount of information considerably increases. If the resource (time, frequency, and spreading code, for example) is allocated in advance in accordance with the estimated maximum amount of control information, when the MIMO multiplexing N increases, remaining resource is reduced, which may result in decrease in throughput. On the other hand, if MIMO multiplexing is used for increasing the number of bits transmitted as the control information, even a user in a wireless transmission environment where MIMO multiplexing is not suitable is required to receive control information containing many bits, which may increase error rate of received control information.

If the power of control channel is increased in order to improve transmission quality, interference with other channels may consequently increase, which results in reduction in the throughput of a wireless communication system. In addition, not all mobile terminals in a mobile phone system usually support MIMO function. There are mobile terminals supporting MIMO function and mobile terminals not supporting MIMO function in such a mobile phone system, which means that the control channel can not always be transmitted using MIMO system. Furthermore, the traffic channel and the control channel need to be controlled to optimize transmission quality. However, if it is desired to increase the information amount of control channel by changing the rate of error correction encoding without using MIMO, the control of the traffic channel and the control channel becomes very difficult because the transmission rate of MIMO multiplexed traffic channel is increased.

SUMMARY OF THE INVENTION

Accordingly, it is a general object of the present invention to provide a novel and useful wireless communication in which one or more of the problems described above are eliminated.

Another and more specific object of the present invention is to provide a wireless communication system and apparatus (for example, base station and mobile terminal) that, even if the amount of information related to the transmission of data is increased, can flexibly transmit the information related to the transmission of data regardless of the use of the MIMO N multiplexing stream independent mode.

To achieve at least one of the above objects, according to an aspect of the present invention, a wireless communication system including a MIMO wireless communication apparatus that can communicate through a plurality of antennas and a non-MIMO wireless communication apparatus (a wireless communication apparatus that does not use MIMO) that can communicate through a single antenna or a plurality of antennas, wherein the MIMO wireless communication apparatus includes a communication unit configured to transmit and receive control information divided into a second control information containing information related to the demodulation and decoding of traffic channel and a first control information containing information related to the MIMO separation of the second control information.

According to another aspect of the present invention, a MIMO wireless communication apparatus having multiple antenna may include a communication unit configured to divide control information including at least information related to the MIMO separation of data of traffic channel into second control information including at least information related to the MIMO separation of the traffic channel and first control data including information related to whether MIMO is used and information related to the MIMO separation of the second control information, multiplex the control information with the data of the traffic channel, process the multiplexed signal for multiple antennas, and the communication unit further separates reception signal corresponding to the multiple antennas, in accordance with the number of MIMO multiplexing.

Other objects, features, and advantages of the present invention will be more apparent from the following detailed description when read in conjunction with the accompanying drawings.

BRIEF DESCRIPTION OF THE DRAWINGS

FIGS. 7A and 7B are schematic diagrams for explaining operation modes, control information, and traffic channels according to an embodiment of the present invention;

FIGS. 8A and 8B are schematic diagrams for explaining operation modes, control information, and traffic channels according to an embodiment of the present invention;

FIG. 14 is a block diagram showing a transceiver unit according to an embodiment of the present invention;

FIG. 15 is a schematic diagram for explaining the structure of channels in accordance with HSDPA technique; and FIG. 16 is a schematic diagram for explaining the relation between the number of MIMO multiplexing and control information.

DETAILED DESCRIPTION OF THE PREFERRED EMBODIMENTS

The preferred embodiment of the present invention are described below with reference to the drawings.

Figure 1:
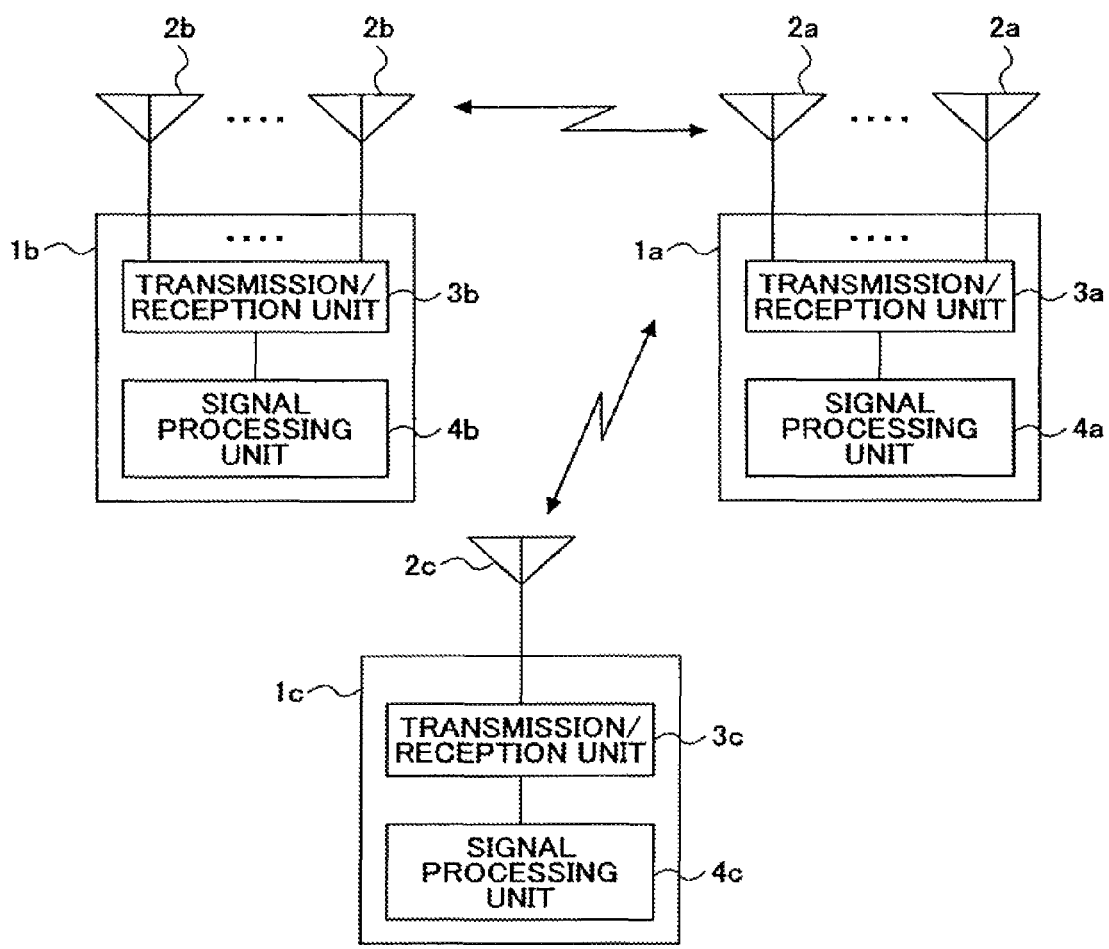
FIG. 1 is a schematic diagram showing a wireless communication system according to an embodiment of the present invention.

Referring to FIG. 1, a wireless communication system according to the present invention includes MIMO wireless communication apparatuses $1a$, $1b$ that can communicate through a plurality of antennas $2a$, $2b$ and a non-MIMO wireless communication apparatus $1c$ that can communicate through a single antenna or a plurality of antennas $2c$. The MIMO wireless communication apparatus $1a$, $1b$ includes a communication unit (transmission/reception unit $3a$, $3b$ and signal processing unit $4a$, $4b$) configured to transmit and receive control information divided into a second control information containing information related to the demodulation and decoding of traffic channel and a first control information containing information related to the MIMO separation of the second control information.

In other words, the wireless communication apparatus $1a$ includes a transmission processing unit (corresponding to transmission/reception unit $3a$ and signal processing unit $4a$) configured to transmit first control information, second control to which transmission processing in accordance with the first control information is applied, the transmission rate of the second control information being changeable, and data to which transmission processing in accordance with at least the second control information is applied.

That is, the wireless communication apparatus $1a$ transmits the first control information before transmitting data (preferably using MIMO multiplexing) through a common channel. The first control information includes information related to the transmission of the second control information processed in accordance with the first control information (for example, information about MIMO multiplexing, modulation technique, rate matching processing, encoding. The first control information allows the transmission rate of the second control information to be variable. The second control information includes information related to the transmission of data processed in accordance with the second control information through a common channel, for example, in the same manner. Preferably, the second control information is transmitted after the beginning (or completion) of the transmission of the first control information. According to another embodiment, however, the second control information can be transmitted at the same time when the first control information is transmitted.

If information related to the transmission of data to be transmitted through a common channel can be transmitted as a part of the first control information (for example, in the case of MIMO N multiplexing 1 packet mode and the amount of information is small), the second control information does not need to be transmitted. If the amount of information is large (for example, in the case of MIMO N multiplexing stream independent mode), the second control information as well as the first control information is preferably transmitted.

According to the above arrangements, the transmitting wireless communication apparatus $1b$ (a reception processing unit corresponding to the transmission/reception unit $3b$ and the signal processing unit $4b$) can identify how the second control information has been transmitted based on the received first control information, and receive the second control information. The reception of the second control information allows the wireless communication apparatus $1b$ to identify how the data is transmitted and receive the data.

The first control information can include information related to how the data has been transmitted. The receiving wireless communication apparatus $1b$ can receive the data using both the first and second control information.

In addition, the first control information can include information indicating whether MIMO multiplexing is used for the first transmission of the second control information (and the second transmission of the data). The receiving wireless communication apparatus can learn whether MIMO multiplexing is used for the first transmission of the second control information based on the first control information, and receive the second control information that is MIMO multiplexed. The first control information can further include identification information of the receiving wireless communication apparatus $1b$. The identification information may be multiplied to the transmission signal.

The wireless communication apparatus according to the present invention may include a communication unit (transmission/reception unit $3a$, $3b$ and signal processing unit $4a$, $4b$) configured to divide control information including at least information related to the MIMO separation of data of traffic channel into second control information including at least information related to the MIMO separation of the traffic channel and first control data including information related to whether MIMO is used and information related to the MIMO separation of the second control information, multiplex the control information with the data of the traffic channel, process the multiplexed signal for multiple antennas 2a, 2b, and the communication unit further separates reception signal corresponding to the multiple antennas 2a, 2b, in accordance with the number of MIMO multiplexing.

The wireless communication system is characterized in that control information required for the reception, demodulation, decoding of traffic channel is divided into first control information and second control information, and transmitted between wireless communication apparatuses. A non-MIMO wireless communication apparatus can receive, demodulate, and decode data of the traffic channel in accordance with parameters transmitted as the first control information. A MIMO wireless communication apparatus can separate the second control information based on the first control information (MIMO separation), and separate, demodulate, and decode the MIMO multiplexed data of the traffic channel in accordance with the second control information. According to the above arrangements, the transmission of control signal does not require more physical resource than the case the MIMO multiplexing is not used. The present invention is applicable to both the case in which multiple packets are transmitted using MIMO multiplexing and the case in which a large block sized packet is transmitted using MIMO multiplexing. The present invention can be adapted even if the number of MIMO multiplexing is varied.

In addition, the first control information, the second control information to which first transmission processing in accordance with the first control information is applied, the transmission rate of the second control information is variable, data to which second transmission processing in accordance with the second control information is applied are transmitted. As a result, even if the amount of information related to the transmission of data is large, the information can be transmitted as the second control information the transmission rate of which is variable.

FIG. 1 is a schematic diagram showing a wireless communication system according to an embodiment of the present invention. The wireless communication system shown in FIG. 1 includes two MIMO wireless communication apparatuses 1a and 1b, and non-MIMO wireless communication apparatus 1c. This wireless communication system supports the High Speed Downlink Packet Access (HSDPA). The MIMO wireless communication apparatuses 1a and 1b have multiple antennas 2a or 2b, respectively. Each of the multiple antennas 2a (2b) may be used both for transmission and reception. Alternatively, one or more of the multiple antennas 2a (2b) may be used for transmission and the other may be used for reception. The non-MIMO wireless communication apparatus 1c has a single antenna 2c both for transmission and reception, or has two antennas (not shown) for transmission and reception, respectively. The MIMO wireless communication apparatus 1a and 1b having the multiple antennas can be switched to non-MIMO wireless communication apparatuses. Each of the wireless communication apparatuses 1a-1c has a transmission/reception unit 3a-3c and a signal processing unit 4a-4c. The transmission/reception unit 3a-3c and the signal processing unit 4a-4c constitute a communication unit of the wireless communication apparatus 1a-1c.

The wireless communication apparatuses 1a-1c form a mobile wireless communication system in which the MIMO wireless communication apparatus 1a is a base station, the MIMO wireless communication apparatus 1b is a mobile station, and the non-MIMO wireless communication apparatus 1c is another mobile station. The wireless communication apparatus 1a is connected to an external network (not shown), and is wirelessly communicably connected to the MIMO wireless communication apparatus 1b and the non-MIMO wireless communication apparatus 1c. The MIMO wireless communication apparatus 1b and the non-MIMO wireless communication apparatus 1c can communicated with other communication apparatuses (not shown) connected to the external network via the MIMO wireless communication apparatus that operates as the base station in its service area.

The signal processing unit 4a and 4b of the MIMO wireless communication apparatus 1a and 1b supports MIMO separation function and MIMO decode function. The MIMO separation function is a function of the signal processing unit 4a and 4b that separates transmission signals for the multiple antennas 2a and 2b, and inputs the separated transmission signals to the transmission/reception unit 3a and 3b. The MIMO decode function is a function of the signal processing unit 4a and 4b that decodes reception signals received by the transmission/reception unit 3a and 3b through the multiple antennas 2a and 2b. The signal processing unit 4a and 4b has a traffic channel, a control channel, and a pilot channel, for example. The signal processing unit 4a and 4b transmits and receives signals by multiplexing them in accordance with transmission procedures.

Physical resource allocated to the control channel among the wireless communication apparatuses 1a-1c is divided into two domains. The control information is also divided into first control information C1 and second control information C2. The first control information C1 and the second control information C2 are allocated to the two domains of the physical resource. An example of the domains of the physical resource includes the domains of time, the domains of frequency, the domains of time and frequency, spreading codes in the case of CDMA system, sub-carriers in the case of OFDM. The first control information may be MIMO-based and the second control information C2 may be non-MIMO-based.

The first control information C1 includes the above-mentioned (g) Xue, that is, the user identification information (UE identity) and information indicating whether the second control information is MIMO-based. The second control information C2 includes the MIMO mode of the traffic channel and information that may increase or be reduced depending on re-transmission control and adaptive modulation control, for example. If much control information is required for MIMO multiplexing, transmission rate is increased by MIMO multiplexing the second control information C2. If much control information is not required for MIMO multiplexing, the transmission rate is reduced without MIMO multiplexing the second control information C2. The signal processing unit 4a and 4b may perform processing described above. The signal processing unit 4a-4c may be provided with a unit that attaches cyclic redundancy check (CRC) to the first control information C1, the second control information C2, or both. The signal processing unit 4a-4c may also include a unit that checks the attached CRC, and a unit that returns the result of the CRC to a wireless communication apparatus at the transmission side. Processing of the signal processing unit 4a-4c may be performed by the arithmetic operation of a Digital Signal Processor (DSP), for example.

According to the above arrangements, the non-MIMO wireless communication apparatus is suffices to receive the first control information C1. (The non-MIMO wireless communication apparatus 1c can receive the second control information and use it for receiving data through the traffic channel.) The MIMO wireless communication apparatuses 1a and 1b receive the first control information C1, and use the received first control information C1 for receiving and separating the second control information C2 which is MIMO multiplexed. The MIMO wireless communication apparatuses 1a and 1b receive data through the traffic channel which is MIMO multiplexed in accordance with information related to demodulation and decoding contained in the second control information C2. Thus, the control information is divided into the first control information C1 and the second control information C2, which contain appropriate information, and MIMO frames can use the same structure as non-MIMO frames do. According to the above arrangements, multiple users can use MIMO multiplexing without changing the allocation of resources such as frame structure, frequency, time, and spreading codes, resulting in increase in the efficiency of resource usage. In addition, the maximum number of MIMO multiplexing can be changed. As a result, if the wireless communication system is enhanced and the maximum number of multiplexing is increased, the wireless communication system according to the present embodiment can be adapted at high flexibility.

Figure 2:
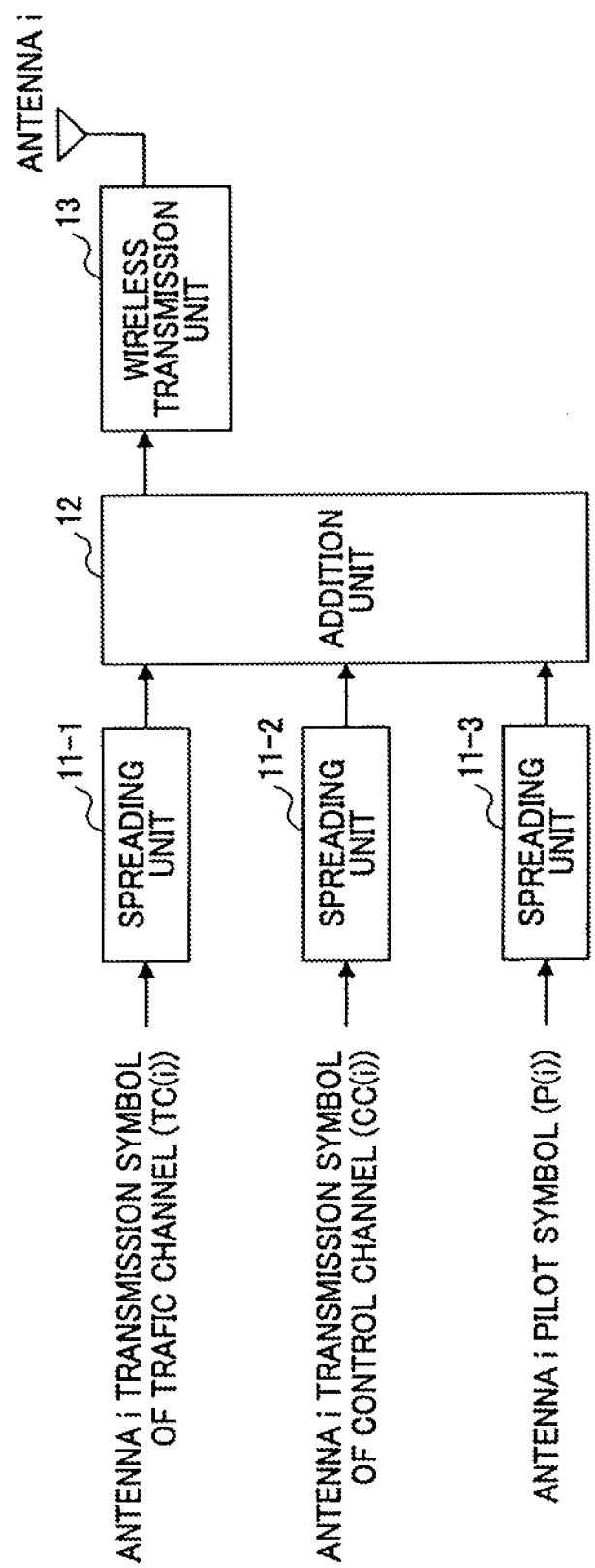
FIG. 2 is a block diagram showing a transceiver unit according to an embodiment of the present invention.

FIG. 2 is a block diagram showing a communication unit corresponding to an antenna i (i=1~m) of the multiple antennas 2a, 2b, and 2c. The communication unit includes spreading units 11-1, 11-2, 11-3, an addition unit 12, and a wireless transmission unit 13. Antenna i transmission symbol (TC(i)) of the Traffic Channel (TC) is input to the spreading unit 11-1. Antenna i transmission symbol (CC(i)) is input to the spreading unit 11-2. Antenna i Pilot symbol (P8i)) is input to the spreading unit 11-3. The spreading unit 11-1, 11-2, 11-3 multiples spreading codes for discriminating multiple channels to input data series. Assuming A (k×Tchip) is spreading code pattern, B (n×Tsymbol) is input symbol, C (k×Tchip) is spread code, and Tsymbol=NSF×Tchip, then C (k×Tchip)=B (int(k/NSF)×NSF×Tchip)×A (k×Tchip). The addition unit 12 adds the multiple spread codes for each chip and input the result to the wireless transmission unit 13. The wireless transmission unit 13 shifts central frequency to a predetermined frequency, amplitudes the power of the spread codes, and transmits the spread codes through the antenna i.

Figure 3:
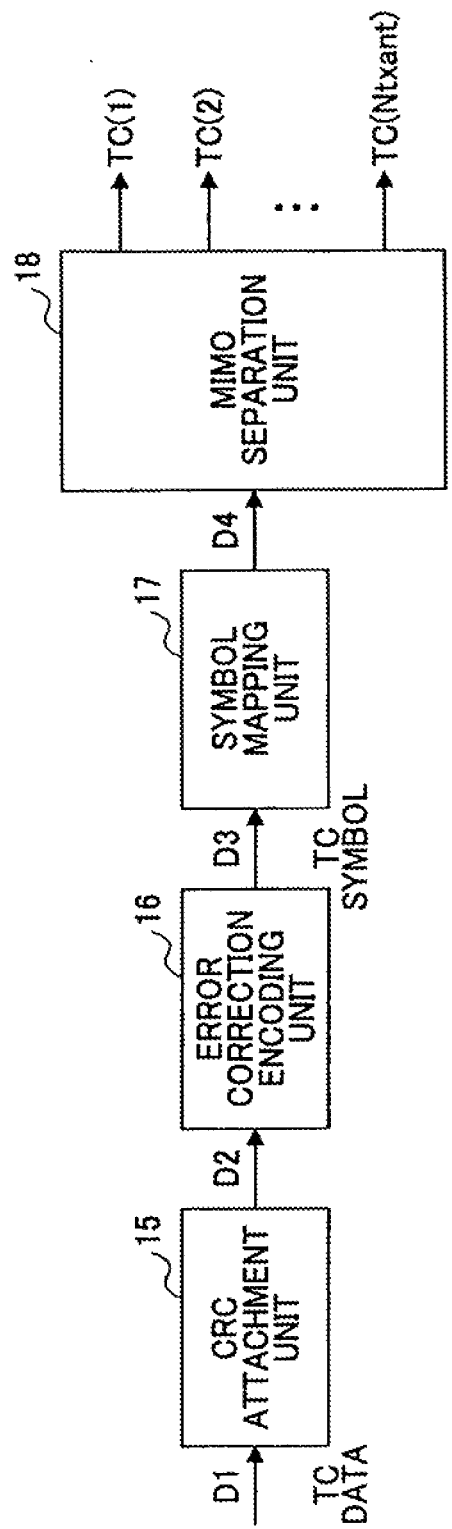
FIG. 3 is a block diagram showing a traffic channel transmission symbol generation unit according to an embodiment of the present invention.

FIG. 3 is a block diagram showing a transmission symbol generation unit of the traffic channel (TC). In FIG. 3, 15 denotes a CRC attachment unit, 16 denotes an error correction coding unit, 17 denotes a symbol mapping unit, and 18 denotes a MIMO separation unit. The transmission symbol generation unit generates transmission symbols corresponding to each antenna i (i=1~m). The transmission symbol generation unit is a part of the signal processing unit 4a, 4b, and 4c. The CRC attachment unit 15 attaches error detection information (CRC) to transmission data series D1 that is transmitted as a single packet thereby to form a data series D2. The generation and attachment of CRC is irrelevant to the essence of the present embodiment, and therefore their description is not given here in detail. For example, a CRC attachment unit described in connection with W-CDMA in chapter 4.2.1 "CRC attachment" of TS25.212 v5.7.0 can be used.

The error correction encoding unit 16 converts the data series D2 to which the error detection information (CRC) is attached into error correction code. This error correction encoding is irrelevant to the essence of the present embodiment, and therefore their description is not given here in detail. For example, convolutional code and turbo code described in chapters 4.2.3.1 and 4.2.3.2 of TS25.212 v5.7.0 may be used as the error correction encoding unit.

The symbol mapping unit 17 performs symbol mapping of the data series D3 that is error correction encoded to QPSK and 16QAM, for example. The result of symbol mapping is input to the MIMO separation unit 18 as the symbol series D4. In the case of QPSK, for example, each 2 bits of input D3= (b0, b1) is mapped to one symbol (I, Q). For example, if b0 and b1 are either 0 or 1, (b0, b1) may be mapped to (I, Q), where I=1−2×b0, and Q=1−2×b1.

In the case of 16QAM, for example, 4 bits of D3=(b0, b1, b2, b3) may be mapped to (I, Q), where I=(1−2×b0)*(2−(1−2×b2)), and Q=(1−2×b0)*(2−(1−2×b2)).

The MIMO separation unit 18, in the case of non-MIMO, outputs D4 to TC(1), but outputs no data to TC(2)~TC(Ntxant). That is, the MIMO separation unit 18 outputs the transmission data series for a single antenna. In the case of MIMO multiplexed, D4-1, D4-2, . . . , D4-Ntxant are generated by symbol mapping from the multiple blocks of the error correction encoding unit 16 using the symbol mapping unit 17. TC(i)=D4-i is transmitted using the $i^{th}$ stream (i=1, 2, . . . , Ntxant) of MIMO multiplexed data stream.

The traffic channel (TC) has three MIMO modes 1-3 (non-MIMO, MIMO-based N multiplexed 1 packet mode, and MIMO-based N multiplexed stream independent mode). In the mode 1, a wireless communication apparatus that does not support MIMO technology or a non-MIMO wireless communication apparatus transmits one packet using a single stream. In mode 2, a MIMO wireless communication apparatus transmits one MIMO multiplexed packet using n streams. Although the amount of transmission data is increased, the amount of the control information does not change. In mode 3, stream independent adaptive modulation and re-transmission control are performed during MIMO multiplexing. A MIMO wireless communication apparatus transmits an independent packet for each stream. Since the packets are independent, control information is required for each packet, resulting in the increase in control information amount.

Figure 4A:
FIGS. 4A through 4C are schematic diagrams for explaining the MIMO separation of traffic channels according to an embodiment of the present invention.
Figure 4B:
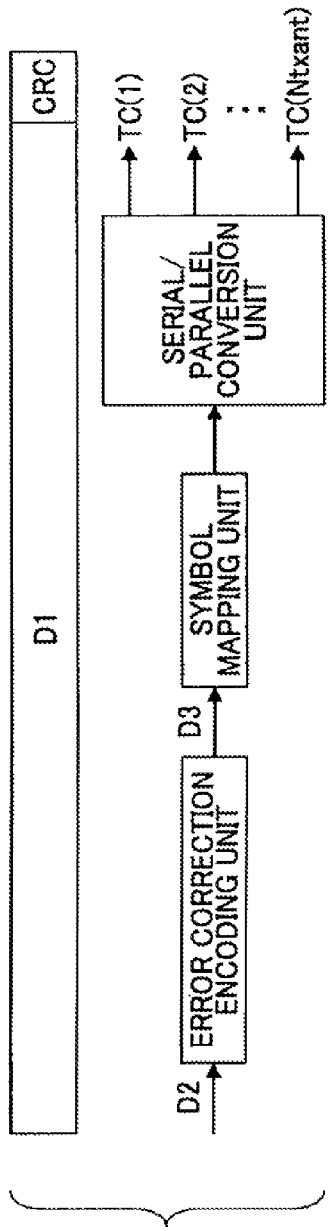
Figure 4C:
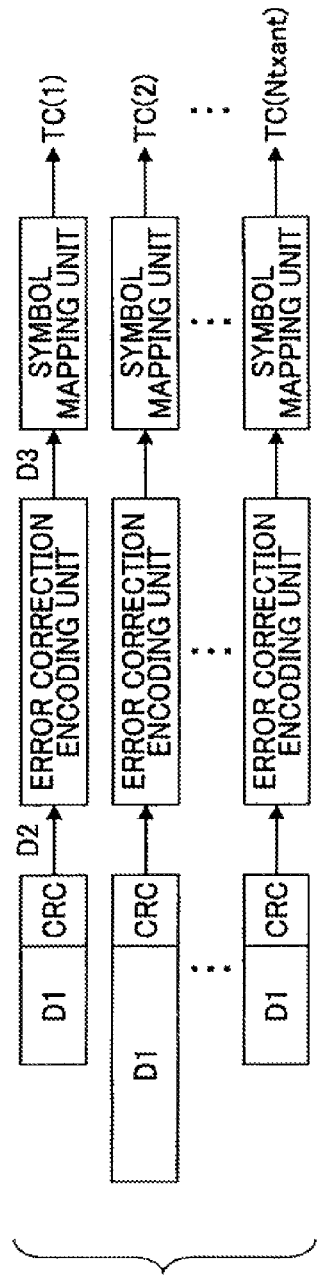

FIGS. 4A-4C are schematic diagrams for explaining the encoding and MIMO separation of traffic channel, each corresponding to respective mode 1-3. The encoding and MIMO separation of traffic channel is performed by the signal processing unit 4a-4c shown in FIG. 1.

FIG. 4A shows processing of mode 1. The CRC attachment unit 15 (FIG. 3) receives the data series D1 of the traffic channel and attaches the error detection information CRC thereto thereby to form the data series D2. The error correction encoding unit 16 receives the data series D2 and converts the received data series D2 into error correction code thereby to form the data series D3. The symbol mapping unit 17 receives the data series D3 and outputs TC(1) corresponding to the traffic channel (TC), but outputs no signal to TC(2)–TC(Ntxant) because MIMO is not used in this case.

FIG. 4B shows processing of mode 2, in which MIMO multiplexing is applied thereby forming a single packet. The CRC attachment unit 15 receives the data series D1 of the traffic channel and attaches the error detection information CRC thereto thereby to form the data series D2. The error correction encoding unit 16 receives the data series D2 and converts the received data series D2 into error correction code thereby to form the data series D3. The symbol mapping unit 17 and a serial/parallel conversion unit receives the data series D3 and outputs TC(1)–TC(Ntxant) corresponding to the traffic channel (TC).

FIG. 4C shows processing of mode 3. In mode 3, an independent packet is transmitted for each stream. Different error detection information CRC may be attached to each stream, and different error correction encoding is performed for each stream. Since different modulation is performed for each stream, different symbol mapping is performed thereby to output TC(1)–TC(Ntxant).

Figure 5:
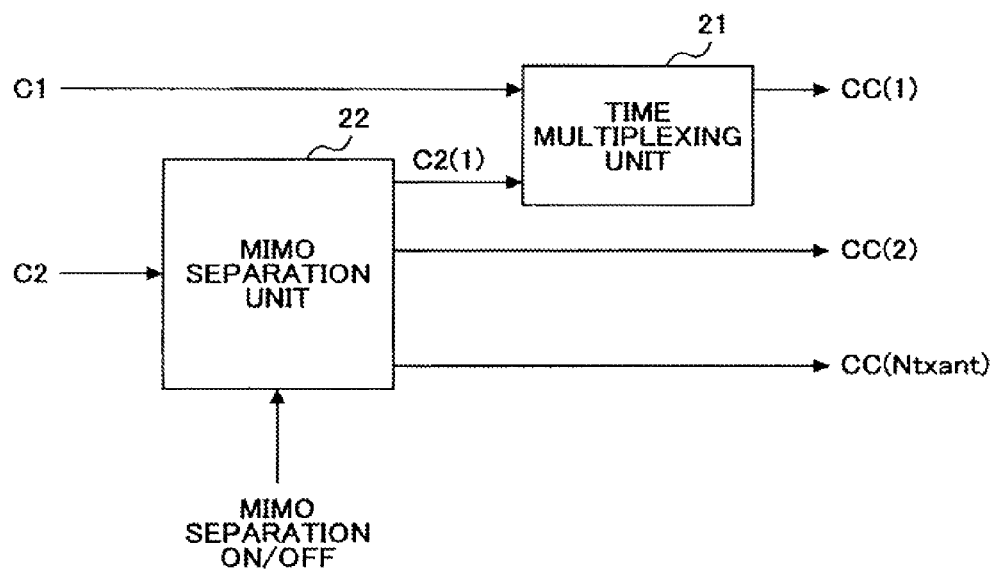
FIG. 5 is a block diagram showing a transmission unit that transmits control information according to an embodiment of the present invention.

FIG. 5 is a schematic diagram showing a transmission symbol generation unit that generates control information corresponding to antennas. The transmission symbol generation unit is a part of the signal processing unit 4a-4c shown in FIG. 1. The transmission symbol generation unit includes a time multiplexing unit 21 and a MIMO separation unit 22.

When the MIMO separation is ON, the control information CC is divided into first control information C1 and second control information C2. The first control information C1 is input to the time multiplexing unit 21, and the second control information is input to the MIMO separation unit 22. The second control information C2 is separated to C2(1)–C2(Ntxant). C2(1) is input to the time multiplexing unit 21 and multiplexed with the first control information C1 thereby to form CC(1). C2(2)–C2(Ntxant) are output as CC(2)–CC (Ntxant), respectively. Since CC(1) needs to be received by non-MIMO wireless communication apparatus, CC(1) is preferably output through a predetermined antenna. However, according to another embodiment, CC(1) may be transmitted through another antenna that is adaptively determined.

If the MIMO multiplexing is to be performed (MIMO separation is ON), the MIMO separation unit 22 performs MIMO separation of the second control information C2 by serial/parallel conversion of the input second control information C2 into multiple signal series CC(1)–CC(Ntxant). The signal series CC(1) among the multiple signal series is input to the time multiplexing unit 21. If the MIMO multiplexing is not to be performed (MIMO separation is OFF), the input second control information C2 is output as a signal series CC(1) as is, and the output signal series CC(1) is input to the time multiplexing unit 21.

Figure 6:
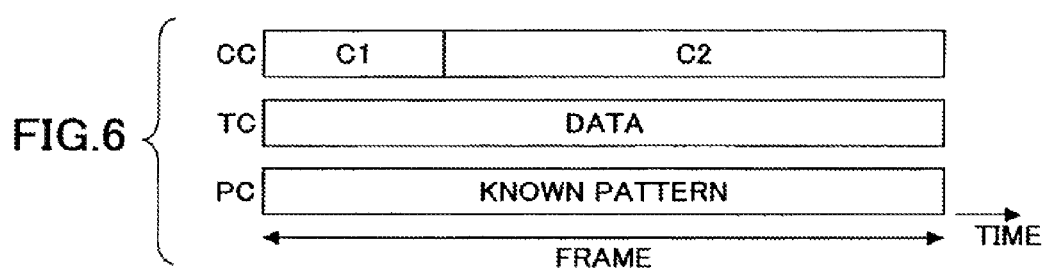
FIG. 6 is a schematic diagram showing the structure of flames according to an embodiment of the present invention.

FIG. 6 is a schematic diagram showing a frame including control information CC, the data of traffic channel TC, and pilot channel, which are time multiplexed. The control information is divided into first control information C1 and second control information C2 as described above.

FIG. 7A shows relation between the classification of control information and the number of allocated bits. FIG. 7B shows correspondence among operation mode, the second control information C2, and the traffic channel TC. FIG. 7A includes the first control information C1, the second control information C2, and the traffic channel TC, as the channel and further includes information indicating whether to perform MIMO multiplexing, information content to be contained in each channel, and the number of bits allocated for each mode and each channel. The first control information C1 is not MIMO multiplexed. The information content of the first control information C1 includes user identification information USER-ID and the MIMO-mode (M1) of the second control information C2. The number of bits required for the user identification information USER-ID is 16 bits for any mode, and the number of bits required for the MIMO-mode (M1) of C2 is the number of MIMO multiplexing for any mode. "1" in a bit i indicates that the $i^{th}$ stream exists.

The second control information C2 is separated the MIMO separation unit 22 shown in FIG. 5 in accordance with MIMO separation information contained in the first control information. The information content of the second control information C2 includes decoding information, demodulation information, and MIMO-mode (M2) of the traffic channel. The number of bits required for the MIMO-mode (M2) of the traffic channel TC is the number of MIMO multiplexing, N, for any mode. The number of bits required for the decoding information and the demodulation information for mode 3 is N times as many as those for mode 1 and 2.

Whether the traffic channel TC is MIMO multiplexed or not is determined by the second control information C2. As described above, the control information the amount of which changes depending on the mode is included in the second control information C2.

According to another embodiment, various systems such as transmission diversity mode may be adapted to the MIMO multiplexing system. In such a case, information indicating that the transmission diversity mode is adapted can be included in the MIMO-mode (M1) of the second control information C2 or the MIMO-mode (M2) of the traffic channel TC. The number of bits of the m1 and M2 may be included in the first control information C1 as they are not dependent on the modes. In this case, the amount of the second control information C2 is proportional to the number of MIMO multiplexing. According to the above arrangements, the amount of the first control unit C1 does not change but the amount of the second control information C2 changes as the number of MIMO multiplexing changes, resulting in increase in transmission efficiency.

FIG. 7B shows whether the second control information C2 and the traffic channel TC are MIMO multiplexed (MIMO) or not (normal) for each mode 1-3. If MIMO multiplexed, adaptive modulation is required for each antenna, which results in increase in the amount of control information. If the second control information C2 is MIMO multiplexed, the amount of the control information can be increased without changing the allocation of physical resource.

FIG. 8A shows relation between the classification of control information and the number of allocated bits, and FIG. 8B shows correspondence among the operation mode, the second control information C2, and the traffic channel TC. FIG. 8A is different from FIG. 7A in that the MIMO-mode (M2) of the traffic channel TC, which is included in the second control information C2 in FIG. 7A, is included in the channel C1 as "MIMO-mode (M1) of C2 and TC". If the control information C2 and the traffic channel TC are multiplexed using the same MIMO-mode (M2), the MIMO-mode (M2) of the TC does not need to be included in the second control information C2, which results in that the relation between the channel and the number of bits shown in FIG. 8A can be used.

FIG. 8B shows the case in which the second control information C2 and the traffic channel TC use the same mode. In FIG. 7B, the second control information C2 indicates normal for the mode 2 and the traffic channel TC indicates MIMO for the mode 2. In FIG. 8B, however, both the second control information C2 and the traffic channel TC indicate MIMO for the mode 2. According to this arrangement, the amount of control information can be reduced, and reception processing can be made simple.

Figure 9A:
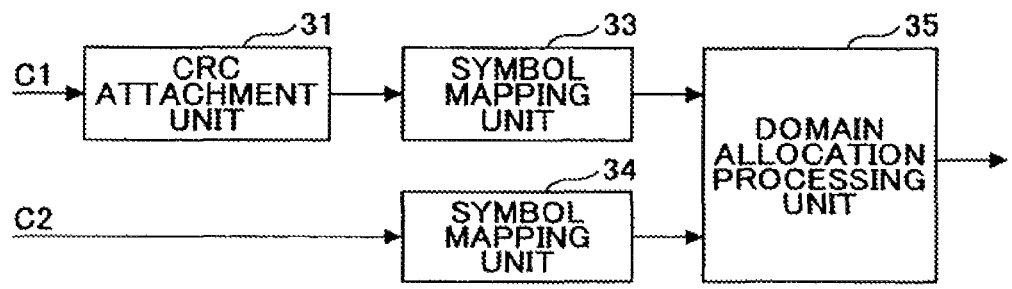
FIGS. 9A through 9C are schematic diagrams for explaining a CRC attachment unit according to an embodiment of the present invention.
Figure 9B:
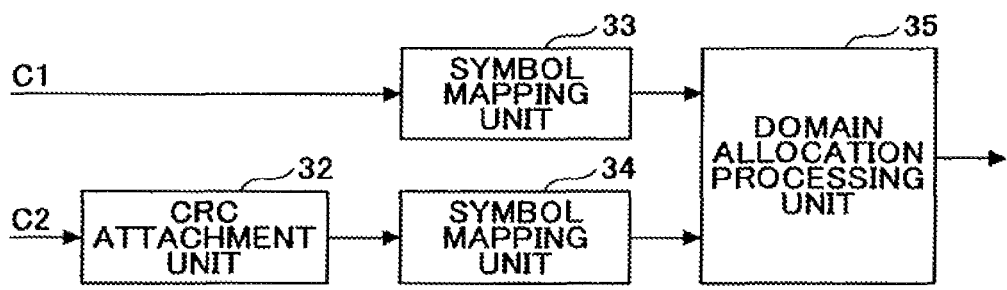
Figure 9C:
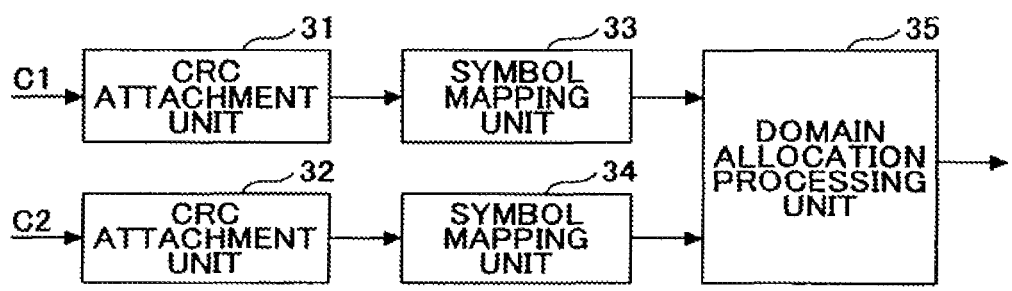

FIGS. 9A-9C show schematic diagrams for explaining the attachment of error detection code CRC. In FIGS. 9A-9C, 31 and 32 denote the CRC attachment unit, 33 and 34 denote the symbol mapping unit, and 35 denote domain allocation processing unit. The attachment is performed by the signal processing unit 4a-4c shown in FIG. 1. FIG. 9A shows the case in which CRC is generated and attached to the first control information C1 by the CRC attachment unit 31. The first control information C1 to which the CRC is attached is input to the symbol mapping unit 33. The second control information C2 is input to the symbol mapping unit 34 as is. Signal series after mapping are input to a domain allocation processing unit 35, and allocated to the physical channel domains.

FIG. 9B shows the case in which the first control information C1 is directly input to the symbol mapping unit 33. CRC is generated and attached to the second control information C2 by the CRC attachment unit 32, and the second control information to which the CRC is attached is input to the symbol mapping unit 34. The first and second control information C1 and C2 are allocated to the physical channel domains after symbol mapping.

FIG. 9C shows the case in which the first control information C1 to which CRC is attached by the CRC attachment unit 31 is input to the symbol mapping unit 33, and the second control information C2 to which CRC is attached by the CRC attachment unit 32 is input to the symbol mapping unit 34. The first and second control information C1 and C2 are allocated to the physical channel domains by the domain allocation processing unit 35 after symbol mapping.

As described above, CRC can be attached to the first control information C1, the second control information C2, or both. In the case in which the first control information C1 to which CRC is attached is transmitted, a receiving wireless communication apparatus can perform error detection on the received first control information C1 using the CRC, and return ACK or NACK to a transmitting wireless communication apparatus in accordance with the result of the error detection. In such a case, if NACK is returned, which means that correct control information can not be transmitted, the transmitting wireless communication apparatus stops transmitting the second control information C2 and the traffic channel TC, and re-transmits the first control information C1.

In the case in which the second control information C2 to which the CRC is attached is transmitted, ACK and NACK can be returned in accordance with the result of the error detection. If NACK is returned, which means correct control information has not been transmitted, the transmitting wireless communication apparatus can stop transmitting the traffic channel. TC in the same manner. In the case in which the first and second control information C1 and C2 to which CRC is attached are transmitted, ACK and NACK can be returned in accordance with the result of the error detection.

According to an embodiment, in the case in which CRC is attached to either the first control information or the second control information, ACK may be set to "0" and NACK may be set to "1". In the case in which CRC is attached to both the first and second control information C1 and C2, ACK1 for the first control information C1 may be set to "00", NACK1 for the first control information C1 may be set to "01". Similarly, ACK2 for the second control information C2 may be set to "10", and NACK2 for the second control information C2 may be set to "11". According to another embodiment, another channel can be provided for transmitting ACK and NACK corresponding to the cases shown in FIGS. 9A-9C from the receiving wireless communication apparatus. In response to receipt of NACK, the transmitting wireless communication apparatus can stop transmitting the traffic channel TC, and re-transmit the first control information C1 and/or the second control information C2.

Figure 10:
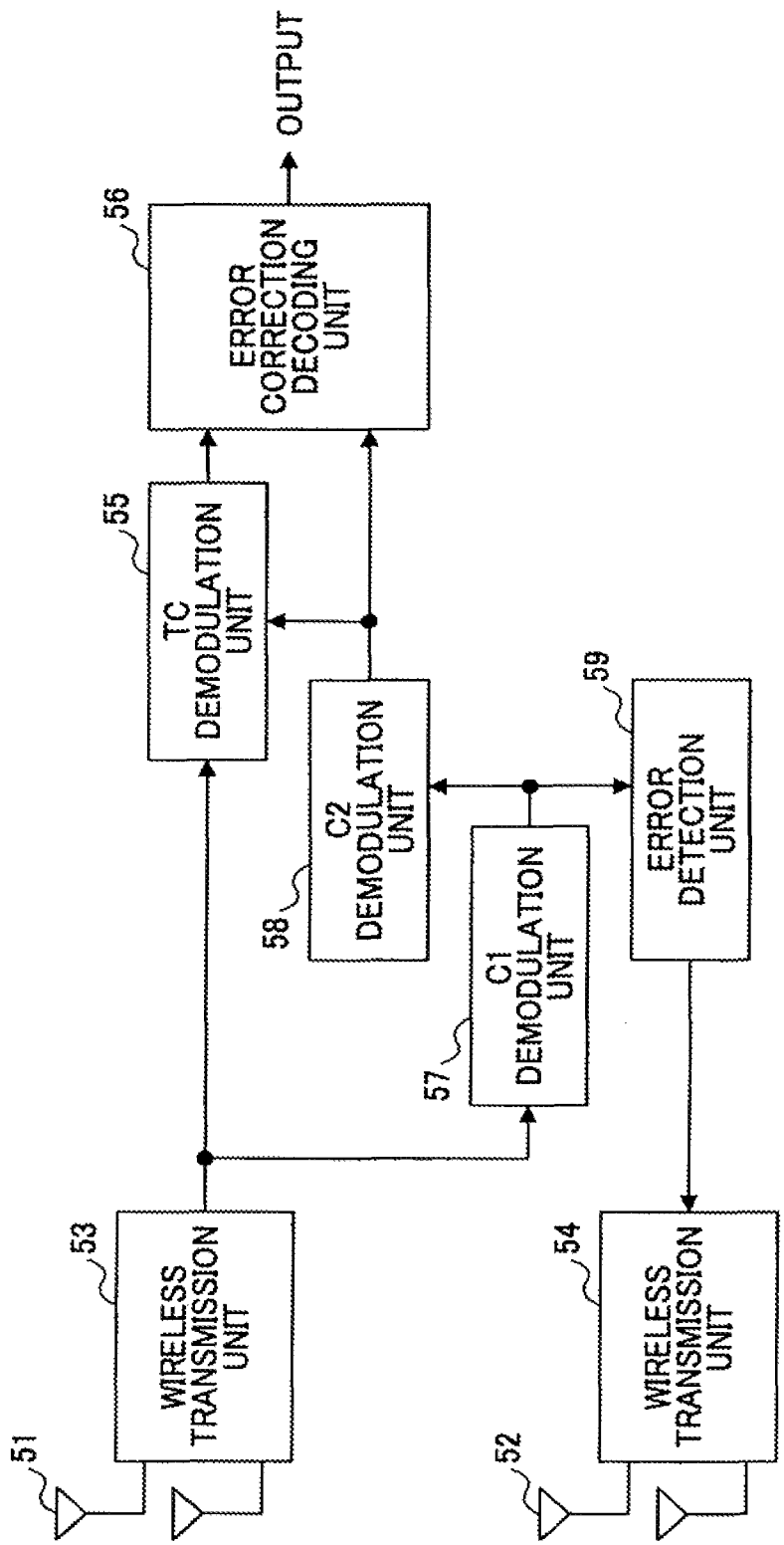
FIG. 10 is a block diagram showing a transceiver unit having an error check unit according to an embodiment of the present invention.

FIG. 10 is a block diagram showing a wireless communication apparatus that can transmit and receive the first control information to which the CRC is attached. 51 and 52 denote antennas, 53 denotes a wireless reception unit, 54 denote a wireless transmission unit, 55 denotes a TC demodulation unit, 56 denotes a error correction decoding unit, 57 denotes a C1 demodulation unit, 58 denotes a C2 demodulation unit, and 59 denotes an error detection unit. This wireless communication apparatus can be used as a mobile terminal of a mobile wireless communication system.

The number of antennas 51 and 52 equals to that of MIMO multiplexing N. The wireless reception unit 53 is provided with a MIMO decoding processing unit (not shown) that receives a MIMO multiplexed signal, demodulates the signal, and separates the signal in accordance with the number of MIMO multiplexing N. The wireless reception unit 53 can be designed based on various known techniques. The wireless transmission unit 54 can be designed based on various known techniques that generates information series corresponding to the antennas and converts the information series into radio frequency.

As shown in FIG. 9A, in a wireless communication system in which the first control information C1 to which CRC is attached is transmitted, a signal is received by a wireless reception unit 53. Then, the first control information C1 is demodulated by a C1 demodulation unit, and checked by an error detection unit 59. If the first control information C1 is correct, a wireless transmission unit 54 returns ACK="0", but if the first control information C1 is found erroneous, the first wireless transmission unit 54 returns NACK="1". In response to receipt of ACK, a transmitting wireless communication apparatus such as a base station transmits the second control information C2 and the traffic channel TC. However, when receiving NACK, the transmitting wireless communication apparatus re-transmits the first control information C1.

In response to the second control information C2 after receiving the first control information, the second control information C2 is demodulated by a C2 demodulation unit 58. The traffic channel TC is demodulated by a TC demodulation unit 55 in accordance with the demodulated second control information C2. An error correction decoding unit 56 performs error correction and decoding on the traffic channel TC. If NACK is returned, since the second control information C2 is not demodulated, processing by the TC demodulation unit 55 and the error correction decoding unit 56 are suspended. According to an embodiment, power to the TC demodulation unit 55, the C2 demodulation unit 58, and the error correction decoding unit 56, for example, may be suspended in order to reduce power consumption.

Figure 11:
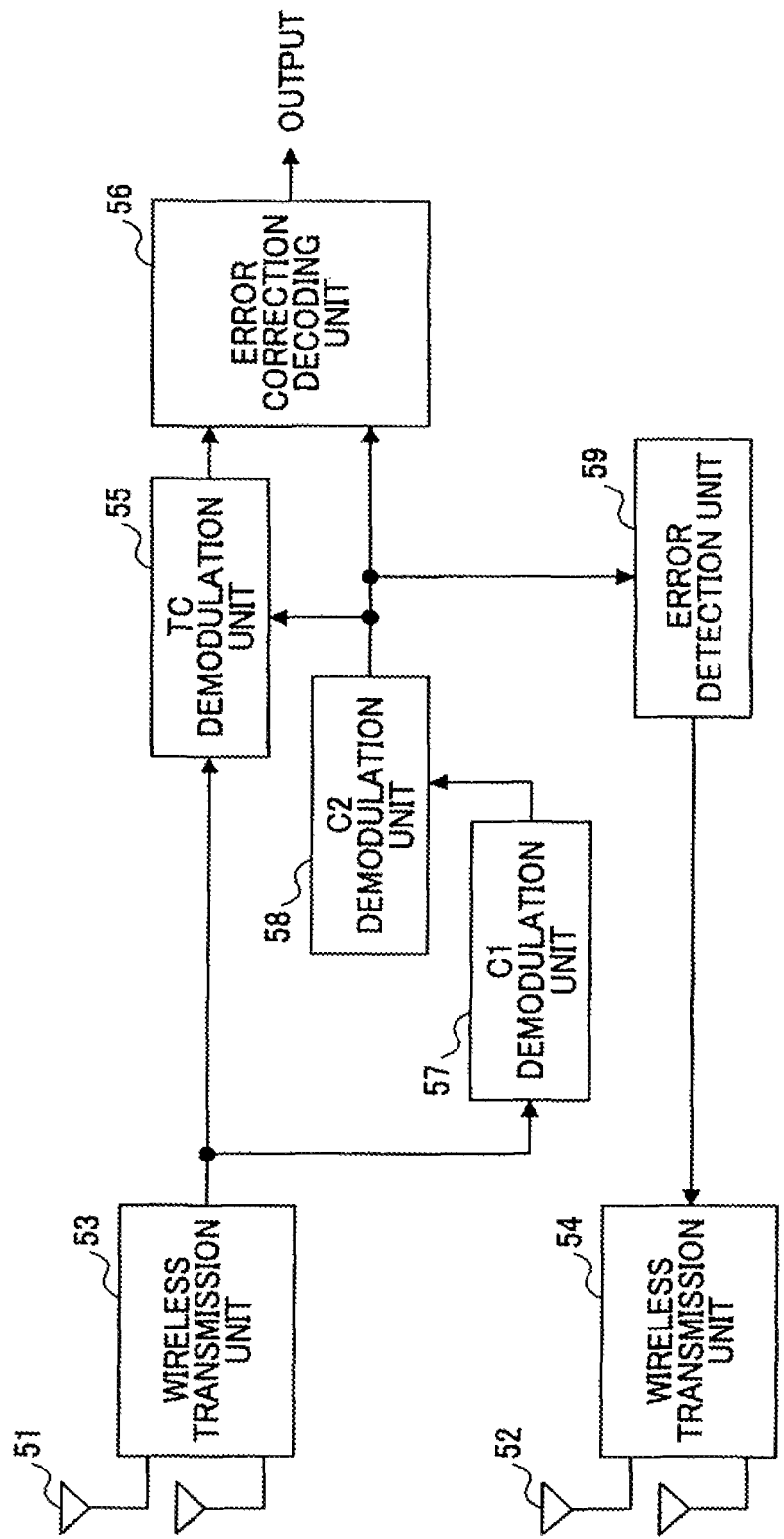
FIG. 11 is a block diagram showing a transceiver unit having an error check unit according to another embodiment of the present invention.

FIG. 11 shows a wireless communication apparatus that can transmit the second control information C2 to which CRC is attached. The same reference numerals as those shown in FIG. 10 denote the same elements, respectively. Although multiple antennas 51 are provided, only one of them is shown to make the drawing simple. Similarly, although multiple antennas 52 are provided, only one of them is shown. In the case of a wireless communication system in which the second control information C2 to which CRC is attached is transmitted as shown in FIG. 9B, the wireless reception unit 53 receives a signal. The first control information C1 is demodulated by the C1 demodulation unit 57. The second control information C2 is demodulated by the C2 demodulation unit 58, and the demodulated second control information is checked by the error detection unit 59 using the CRC. ACK or NACK is returned by the wireless transmission unit 54 depending on the result of the error check in the same manner as the previous example. If the second control information C2 is correct and ACK is returned, the TC demodulation unit 56 demodulates the traffic channel TC, and the error correction decoding unit 56 decodes the demodulated data from the TC demodulation unit 56. If the second control unit C2 is incorrect and NACK is returned, processing by the TC demodulation unit 55 and the error correction decoding unit 56 are suspended.

Figure 12:
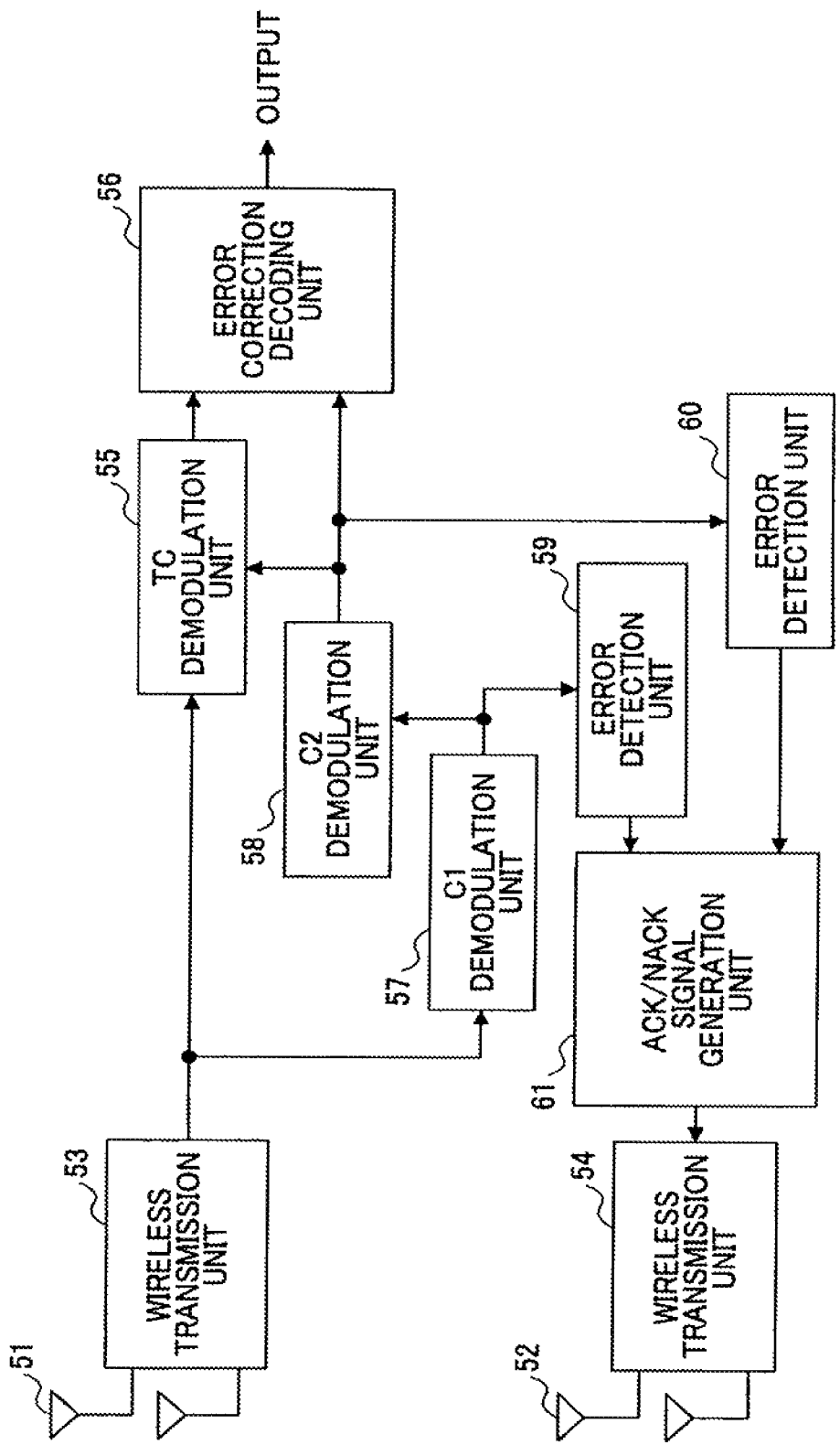
FIG. 12 is a block diagram showing a transceiver unit having an error check unit according to yet another embodiment of the present invention.

FIG. 12 is a block diagram showing a receiving wireless communication apparatus in the case in which CRC are attached to the first and second control information C1 and C2. The same reference numerals as those shown in FIGS. 10 and 11 indicate the same elements. In FIG. 12, 60 denotes a error detection unit, and 61 denotes a Ack/Nack signal generation unit. The error detection unit 59 performs error detection on a demodulated signal from the C1 demodulation unit 57 using CRC attached to the first control information C1.

The error detection unit 60 performs error detection on the demodulated signal from the C2 demodulation unit 58 using the CRC attached to the second control information C2. The Ack/Nack signal generation unit 61 sets ACK1 for the first control information C1 to "00", NACK1 for the first control information C1 to "01", ACK2 for the second control information C2 to "10", and NACK2 for the second control information C2 to "11", for example, as described above. The generated ACK or NACK is returned through the wireless transmission unit 54.

In response to receipt of ACK1, for example, a transmitting wireless communication apparatus transmits the second control information C2. If NACK1 is received, the first control information C1 is re-transmitted. If ACK2 is received, the traffic channel TC is transmitted. If NACK2 is received, the second control information C2 is re-transmitted.

Figure 13:
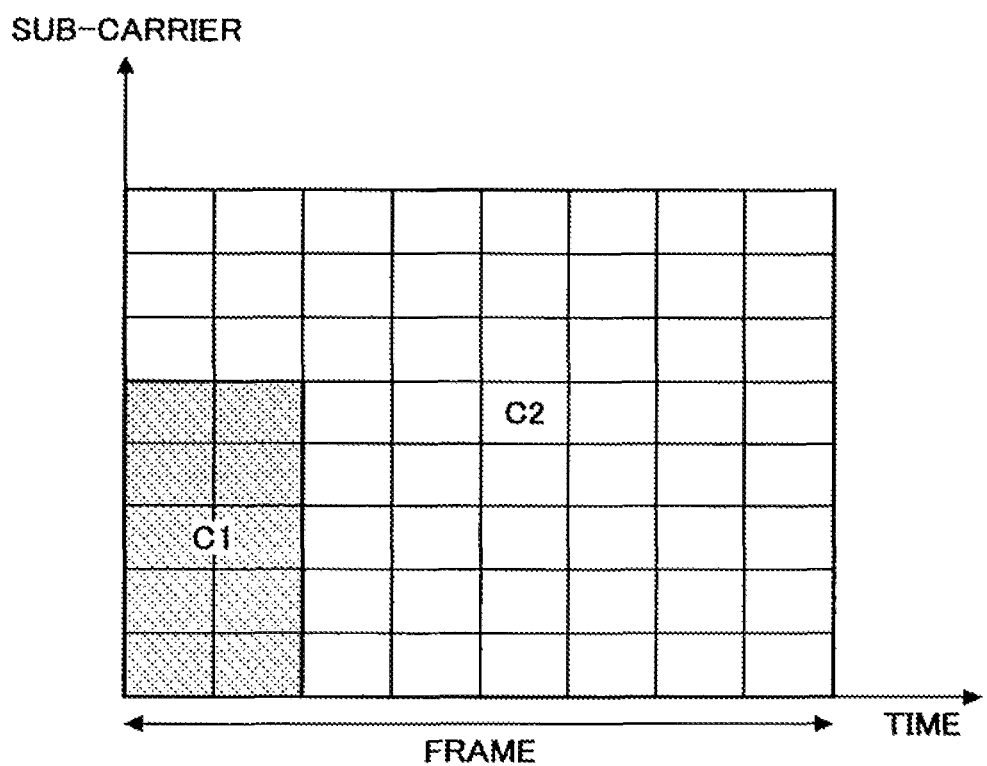
FIG. 13 is a schematic diagram for explaining the allocation of time and frequency to first control information and second control information according to an embodiment of the present invention.

In the case of a wireless communication system using Orthogonal Frequency Division Multiplexing (OFDM) or multi carrier, the first control information C1 and the second control information C2 for one frame can be disposed in a time-frequency domain as shown in FIG. 13, where the horizontal axis corresponds to time and the vertical axis corresponds to a sub-carrier. In the case of a CDMA system, since multiple spreading codes can be selected, the physical resource including frequency, time, and spreading code can be allocated to the first control information C1 and the second control information C2 in accordance with their amount by adapting CDMA system to OFDM system. According to another embodiment, the MIMO system may be combined with the OFDM system, the CDMA system, and the Space diversity system. In such a case, information indicating the transmission system is included in the first control information C1 thereby to allow the second control information C2 and the traffic channel be received.

All wireless communication apparatuses in a wireless communication system are required to know the adapted transmission system such as the MIMO system. If the information is given to all users, the system structure can be varied. In such a case, a notice channel can be used through which all the users can receive the information. For example, the first control information C1 only needs to be available at the time when the traffic channel TC is received. The first control information C1 may be transmitted through the notice channel thereby to make all users noticed. In addition, before data is transmitted through the traffic channel TC, the first control information C1 may be transmitted as a part of control information of a upper layer.

FIG. 14 is a block diagram showing a wireless communication apparatus in the case the first control information C1 is transmitted through a notice channel. In FIG. 14, 70 denotes a multiplexing unit, 71-74 denote spreading units, 75 denotes an addition unit, 76 denotes a wireless transmission unit. These elements corresponds to an antenna 1 among multiple antennas. The transmission format information of the first control information C1 is multiplexed with other notice information by the multiplexing unit 70 and input to the spreading unit 74. The antenna 1 transmission symbol (TC(1)) of the traffic channel TC is input to the spreading unit 71. The antenna 1 transmission symbol (CC(1)) of the control information CC is input to the spreading unit 72. The antenna 1 pilot symbol (P(1)) is input to the spreading unit 73. The symbols are spread using different spreading codes, and added by the addition unit 75 chip by chip. The symbols are modulated for the antenna 1 and transmitted by the wireless transmission unit 76. The notice information is transmitted from the base station of the mobile wireless communication system. The mobile terminal can know the transmission format of the first control information C1 based on the received notice information, and receive the second control information C2 and the traffic channel TC.

The present invention is not limited to these embodiments, but various variations and modifications may be made without departing from the scope of the present invention.

This patent application is based on Japanese Priority Patent Application No. 2004-360878 filed on Dec. 14, 2004, the entire contents of which are hereby incorporated by reference.

What is claimed is:

1. A wireless communication apparatus, comprising:
a transmitting apparatus and a receiving apparatus, wherein the transmitting apparatus includes:
a transmission processing unit configured to transmit, from the wireless communication apparatus to another wireless communication apparatus, first control information including control information regarding MIMO, second control information to which first transmission processing in accordance with the first control information is applied, and data to which second transmission processing in accordance with the first control information and the second control information is applied,
wherein the first control information includes information relating to performing Multiple Input Multiple Output (MIMO), and the second control information includes Hybrid-ARQ process information, redundancy and constellation version information, and transport block size information.

2. A wireless communication system, comprising:
a transmitting apparatus and a receiving apparatus, wherein a transmission processing unit configure to transmit, from the wireless communication apparatus to another wireless communication apparatus, first control information including control information regarding MIMO, second control information to which first transmission processing in accordance with the first control information is applied, and data to which second transmission processing in accordance with the first control information and the second control information is applied, and wherein
the receiving apparatus includes:
a reception unit configured to receive the first control information, the second control information, and the data,
wherein the first control information includes information relating to performing Multiple Input Multiple Output (MIMO), and the second control information includes Hybrid-ARQ process information, redundancy and constellation version information, and transport block size information.

3. A wireless communication apparatus, comprising:
a receiving unit configured to receive from another wireless communication, first control information including control information regarding MIMO, second control information to which first transmission processing in accordance with the first control information is applied at the another wireless communication apparatus, and data to which second transmission processing in accordance with the first control information and the second control information is applied at the another wireless communication apparatus,
wherein the first control information includes information relating to performing Multiple Input Multiple Output (MIMO), and the second control information includes Hybrid-ARQ process information, redundancy and constellation version information, and transport block size information.

* * * * *

UNITED STATES PATENT AND TRADEMARK OFFICE
CERTIFICATE OF CORRECTION

PATENT NO.        : 8,681,747 B2
APPLICATION NO.   : 13/160960
DATED             : March 25, 2014
INVENTOR(S)       : Dateki et al.

Page 1 of 1

It is certified that error appears in the above-identified patent and that said Letters Patent is hereby corrected as shown below:

In the Claims:

In Col. 16, line 31 claim 2: "the wireless communication apparatus" should be "a wireless communication apparatus"

In Col. 16, lines 49-50 claim 3: "another wireless communication," should be "another wireless communication apparatus,"

Signed and Sealed this
Third Day of June, 2014

Michelle K. Lee
*Deputy Director of the United States Patent and Trademark Office*